CHARLES S. DUNBRACK.

Improvement in Boots and Shoes.

No. 4,422. Reissued June 13, 1871.

Witnesses.

S. N. Piper

L. N. Moller

C. S. Dunbrack by his attorney.

R. Uddy

AM. PHOTO-LITHOGRAPHIC CO. N.Y. (OSBORNE'S PROCESS.)

UNITED STATES PATENT OFFICE.

CHARLES STORY DUNBRACK, OF SWAMPSCOTT, ASSIGNOR OF ONE-THIRD INTEREST TO WILLIAM N. SPINNY, OF LYNN, MASSACHUSETTS.

IMPROVEMENT IN BOOTS AND SHOES.

Specification forming part of Letters Patent No. 95,210, dated September 28, 1869; reissue No. 4,422, dated June 13, 1871.

*To all persons to whom these presents may come:*

Be it known that I, CHARLES STORY DUNBRACK, of Swampscott, of the county of Essex and State of Massachusetts, have made a new and useful invention having reference to Shoes or Boots; and I do hereby declare the same to be fully described in the following specification and represented in the accompanying drawing, of which—

Figure 1:
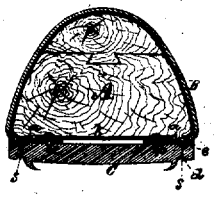
Figure 2:
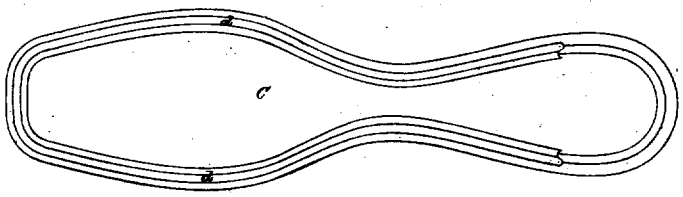
Figure 3:
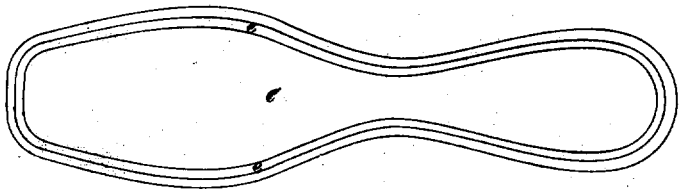
Figure 4:
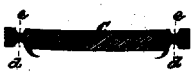

Figure 1 denotes a transverse section of a shoe upper, lasted and having applied to it and the insole a sole prepared in accordance with my invention; Fig. 2 is a top view; Fig. 3, a bottom view; and Fig. 4, a transverse section of the sole or outer sole as it appears preparatory to being lasted upon the upper and screwed thereto.

In carrying out my present invention I make the outer sole with a groove or channel to receive the upper, such groove or channel being made in that face of the sole against which the upper is to abut. The outer sole, besides having such a groove, is made or provided with a stitch-receiving groove in its opposite face, the whole being substantially as hereinafter described.

In making the shoe or boot as represented, it is to be otherwise made in the usual manner, except that the sewing for confining the sole to the upper is to go around the edge of, without going through, the insole, as shown.

In the drawing, the last is represented at A as put on the shoe after the sole may have been sewed to the upper, the same answering to show the positions of the insole, the upper, and the outer sole when lasted. The last is shown recessed in its bottom or sole to receive the inner sole or lap-supporter *b* of the upper, such being shown as provided with spurs *c* extended from it, and to serve in lasting the upper and outer sole on the insole.

In Fig. 1, B exhibits the "upper," or upper leather or vamp, and C the outer sole of the shoe. The outer sole C I form with a lipped channel, *d*, to receive the sewing, shown at S, such channel being in its outer face or tread. In the opposite side of the sole I make the groove *e* to receive the laps of the vamp or upper, the said groove *e* going around the sole near its periphery and directly over the channel *d*. The groove *e* is to enable the upper to be drawn into the sole by the sewing extending through the sole from the groove *d*, the same being to prevent the stitches from being seen or exposed when the upper is drawn upward from the outer sole. Furthermore, the groove is advantageous in other respects, or it operates to make a closer joint between the outer sole and the upper, and thus renders the joint less liable to let water into the shoe. It also enables the stitches to be drawn down out of the way of the edge of the insole, and the upper to be so drawn away from such edge as not to be cut thereby while the shoe may be in use.

I claim as my invention the following, viz.:

1. A shoe, as made with an upper receiving-channel, *e*, in that face of the sole which is next to the laps of the upper.

2. A shoe, as made with an upper receiving-channel, *e*, in the outer sole, and with a stitch-receiving channel, *d*, in the opposite face of the said sole.

3. A shoe, as made with an upper receiving-channel, *e*, in its outer sole, and with the stitching or sewing for connecting such sole to the upper carried around the periphery of, but not through, the insole.

4. A shoe, as made with the outer sole channeled in its two opposite faces, as set forth, and with the sewing for fastening the said sole to the upper carried through the two channels of the sole and around, but not through, the insole or the part *b*, for supporting the laps of the upper.

5. An outer sole, as made with the upper receiving-groove or channel *e*, arranged in that face, or part of it, which is to abut against the upper leather to be joined to the sole.

6. An outer sole, as made with the sewing or stitch-groove *d* on its outer face, and with the upper receiving-groove *e* in its inner or upper face, such grooves being arranged relatively or opposite to each other in manner as represented.

CHARLES STORY DUNBRACK.

Witnesses:

R. H. EDDY,

S. N. PIPER.